UNITED STATES PATENT OFFICE.

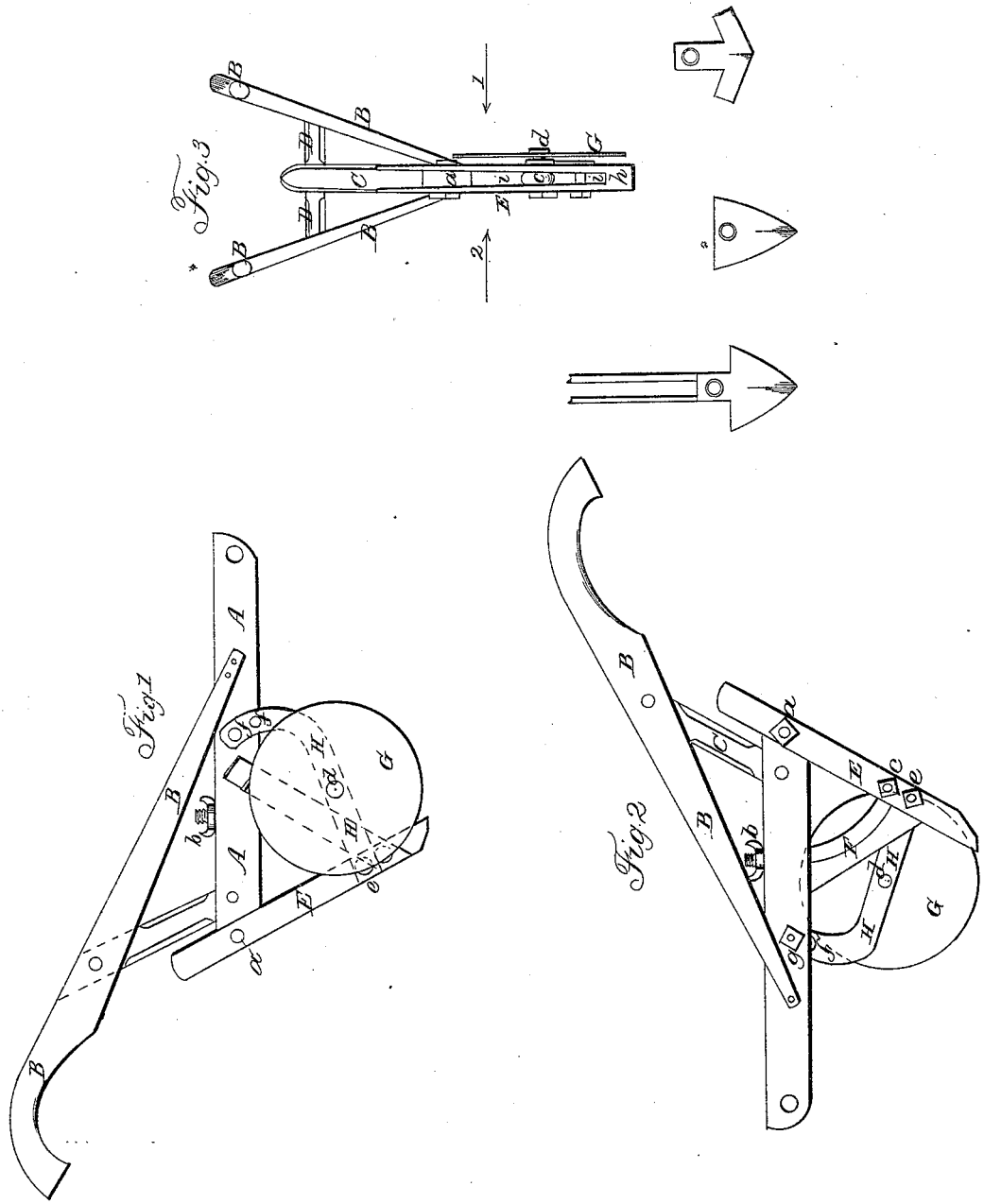

M. RIGELL, OF DAWSON, AND W. D. IVEY, OF MILFORD, GEORGIA.

IMPROVEMENT IN COTTON-CULTIVATORS.

Specification forming part of Letters Patent No. 29,196, dated July 17, 1860.

*To all whom it may concern:*

Be it known that we, MARK RIGELL, of Dawson, in the county of Terrell and State of Georgia, and W. D. IVEY, of Milford, in the county of Baker, in the State of Georgia, have invented certain new and useful Improvements in Cultivators or Siders; and we do hereby declare that the following is a full, clear, and exact description thereof, reference being had to the accompanying drawings, forming a part of this specification, in which—

Figure 1 represents a side view of our cultivator or sider, looking in the direction of arrow 1, Fig. 3. Fig. 2 represents a side view of the same, looking in the direction of arrow 2, Fig. 3; and Fig. 3 represents a rear view of the same.

A represents the draft-beam; B B, the handles, attached to beam A, and supported by braces C D.

E is the standard, hinged at $a$ to the rear of the beam A, so that it can be adjusted by screwing up or unscrewing the nut $b$ on the adjusting-rod F, which is free to turn on a fulcrum, $c$, in the colter.

A guard-wheel, G, is attached to a brace or plate, H, on a fulcrum, $d$, the brace or plate H being pivoted at $e$, while its other end is perforated with holes $f f$, whereby it can be adjusted to set the wheel G up or down by means of the bolt $g$, which passes through the beam A and one of the holes $f$ in plate H.

The standard E may be made in one piece, as shown in the drawings, or of two side pieces, with an enlargement at $h$ on each piece, whereby the sides will be kept parallel when fastened together, while a slit or opening, $i$, will be left in the upper part, as fully shown in the drawings.

The lower end of the standard E may be made of the proper form to work and pulverize the earth, although we prefer to use separate plows or cutters, which can be quickly fastened to the lower end of E by a bolt passing through the opening or slit $i$. By the latter arrangement different plows or cutters can be used at pleasure and with but little trouble. As the machine is drawn along between the rows of young plants the wheel G prevents the earth from being thrown upon them, although the plow or cutter runs close up to them. As the wheel turns it does not clog up, but works freely and guards the young plants from injury as the machine is drawn forward in the usual manner.

Having described our improved cultivator and sider, what we claim as new, and desire to secure by Letters Patent, is—

The arrangement of the guard-wheel G, plate H, and adjusting-rod F, with the beam A and standard E, as and for the purposes set forth.

It witness whereof we have hereunto signed our names.

MARK RIGELL.
W. D. IVEY.

In presence of—
MOSES H. BALDWIN,
JOHN W. WISEMAN.